United States Patent Office 3,763,085
Patented Oct. 2, 1973

3,763,085
REFRACTORY COMPOSITION
Robert N. McFadgen, York, Pa., assignor to The
J. E. Baker Company, York, Pa.
No Drawing. Continuation of abandoned application Ser.
No. 813,710, Apr. 4, 1969. This application Aug. 23,
1971, Ser. No. 174,264
Int. Cl. C04b 35/66; C08f 31/02, 33/02, 45/04;
C08h 13/08, 17/04
U.S. Cl. 260—41 B
8 Claims

ABSTRACT OF THE DISCLOSURE

A pourable, non-hydratable, premixed, refractory ramming, patch or lining material for high temperature furnaces, ladles, and the like, consisting essentially of non-acid refractory aggregate such as particulate dolomite, magnesite, etc., mixed with about 2–5% of a water-resistant, normally liquid or plastic polymeric material, such as the lower molecular weight petroleum hydrocarbon resins, α-methyl styrene polymers, polybutenes and coumarone-indene resins.

---

This application is a continuation of Ser. No. 813,710 filed, Apr. 4, 1969, now abandoned.

This invention relates to refractory compositions and more particularly to premixed compositions containing a refractory aggregate and a binder, suitable for patching, lining or repairing high temperature apparatus, such as metallurgical furnaces, rotary kilns, ladles, etc. The invention provides a premix of refractory aggregate containing an unusually small amount of a selected organic polymeric binder which, even though present in small quantity, provides excellent binding properties during the application and use of the material, eventually enabling the formation of a strong dense ceramic bond upon burning out when the apparatus is placed in use. Due to the properties of the polymeric organic binder and the small amount used, the premix is in free-flowing, pourable form, and does not set up during storage and transportation. It does not stick to container walls or tools but has excellent cohesion and adhesion when applied by usual methods.

Heretofore, most ramming, patching, gunning mixtures and the like have either used inorganic binders of the type which set when mixed with water at the place of use, or pitch or tar based binders which either have to be heated for mixing and application or mixed with volatile solvents. Premixed materials of the latter type have poor storage life and stability as the solvents tend to evaporate. They are often sticky and hard to handle and the mixtures tend to lose their shape or to fall out of the patched or lined area during the heating up of the apparatus to which they are applied. Moreover, it is generally necessary to use about 6–12% or more of binder in these mixes.

It has been suggested in the art that substantially any hydrocarbonaceous material which is a viscous liquid or semi-solid at temperatures of mixing or blending, and which can be coked at elevated temperatures, would provide satisfactory binders for refractory materials. While such binders may be satisfactory for some instances in which the mixture of aggregate and binder is to be molded into shape form immediately after mixing, many of them are quite unsuitable for ramming, patching and lining mixtures which are to be manufactured, stored and later shipped to the point of use. Prior to the present invention applicants were unaware of any refractory mixes containing workable, cokable organic binders which would meet the desired requirements of storage life, stability, and ease of handling, as well as providing satisfactory adhesion and binding strength at the point of application.

By the present invention a pourable, non-hydratable, premixed, refractory ramming, patching or lining material for high temperature apparatus is provided by mixing non-acid refractory aggregate such as particulate dolomite, magnesite, etc., with about 2–5% of a water-resistant, normally liquid or plastic polymeric material selected from the lower molecular weight petroleum hydrocarbon resins, α-methyl styrene polymers, polybutenes and coumarone-indene resins. This mixture provides an unusual and unexpected combination of properties, to wit:

(1) As mixed, the material is free flowing and can be stored in this manner until used. It can be applied by pouring into any desired aperture.

(2) Upon the application of slight pressure such as is the natural result of the usual methods used in the art e.g., troweling, ramming, etc. this material becomes self-adherent so that it forms a cohesive monolithic mass adherent to itself and to most of the types of surfaces which are normally found in refractory applications, such as metal or refractories. After application, it remains in place as a monolithic mass in any position, even in an inverted position.

(3) Upon heating, a strong carbonaceous bond replaces the original bond at moderate temperatures. This carbonaceous bond can last indefinitely at these temperatures under reducing conditions and then last until a ceramic bond is formed at the appropriate temperatures under oxidizing conditions. The fact that there is a relatively small amount of carbonaceous material facilitates the formation of a very dense ceramic structure in the area in which the premix has been applied when the apparatus is burned in use.

The refractory grain materials which can be used in the compositions of the present invention include any of the non-acid or basic refractory grain materials known in the metallurgical arts, including, dead-burned magnesia, magnesite, dead-burned dolomite, alumina and the usual combinations with mineral additive materials, and mixtures thereof. The invention is of particular advantage with dead-burned dolomite and other exceptionally hydratable materials since the binder coats the grains and acts as a sealant whereby the resulting composition is water-resistant. Dead-burned dolomite grains of particle size ranges known to the art may be used in the composition. For example, the size range may be such that all of the grains pass through a No. 4 screen and about 40–60% are retained on a No. 50 screen (U.S. Standard sieve sizes). The grain size is usually selected to provide the desired density upon ramming or otherwise placing the material in the apparatus. Premixes of dolomite aggregate and the polymeric binder can be compacted to very high density.

The binder materials of the invention are selected from low molecular weight polymeric materials, such as low molecular weight α-methyl styrene polymers, petroleum hydrocarbon resins, polybutenes and coumarone-indene resins. Surprisingly, these have been found to have the necessary properties whereas other closely related polymers and resins provide poor or unsatisfactory results. The preferred resins of the specified classes are those which have softening points below 100° C. and preferably below about 40° C. Many of these materials are available in liquid form.

A representative α-methyl styrene polymer in liquid form is that marketed as "Amoco Polymer AMS–10." This polymer has a viscosity (SSU at 210° F.) of 70 to 120, less than 0.4% volatiles, a flash point (COC) of 320° F., and a dimer content of 22–40% by weight. This liquid polymer as well as other α-methyl styrene polymers of low molecular weight are quite suitable for the present invention. They are compatible with coumarone-indene and petroleum hydrocarbon resins as well as with the somewhat higher molecular weight α-methyl styrene polymers and accordingly, can be used in a mixture with these materials if desired. The liquid polymers in combination with the semi-solid polymers provide useful binders which are plastic and workable at ambient atmospheric temperatures.

The "petroleum hydrocarbon resins" as referred to in the present specification and claims are defined as by-products from the cracking of petroleum crudes. These petroleum hydrocarbon resins are described on page 104 of Modern Plastics Encyclopedia, September 1957 issue. A series of these resins is available under the tradename "Transphalt." Transphalt products are obtained from the bottom stream of a cracking process for petroleum crude oils. They differ in both chemical and physical properties from coal tar and petroleum pitch products. The Transphalts are more highly aromatic and have a more narrow molecular weight spread than coal tar, pitch and asphalt cuts. Those of the Transphalt series which are liquid or have melting points below 100° C. are quite suitable for the purposes of the present invention although the solid forms are preferably used in combination with a non-volatile thinner such as fuel oil. Transphalt L-4, for example, is a liquid having a viscosity (SUV at 210° F.) of 45-55.

A series of low molecular weight polybutene polymers useful for the purposes of this invention are available in the trade. These are, in general, the polybutenes which have molecular weight under about 2,000 and pour points under about 65° C. Typical of these is one marketed by Amoco under the trade designation "H-300." This material has a viscosity (SSU at 210° F.) of 3,000, a molecular weight of 1290, a flash point (COC) of 460° F. and a pour point of 35° F.

A number of low molecular weight coumarone-indene resins are available in the form of soft solids, i.e. having a softening point below 100° C. Typical of these suitable for the purposes of the present invention are those marketed under the tradename "Piccovar AP-10" and "Piccovar AP-25." The first of these has a softening point by the ball and ring method of from 5-15° C. and the second has a softening point by the ball and ring method of from 30-40° C.

Any of the foregoing materials may be used alone or if desired thinned with a small amount of fuel oil or other nonvolatile organic liquid with which the resins are compatible. It will be understood that, if it is desired to increase the amount of carbon in the refractory mixture, powdered carbonaceous materials such as carbon black, powdered coal, coke or graphite or powdered hard pitch in suitable quantity may be added.

In order to illustrate the unexpected properties of the classes of low molecular weight resinous materials utilized by the present invention, representative mixtures were made of these and other resins with a dead-burned dolomite aggregate. This aggregate was typical of a patching mixture and provided dead-burned dolomite particles of a size gradation about 25% through No. 4 and retained on No. 12, about 50% passing through No. 12 and retained on No. 50 and the remainder passing through No. 50 (U.S. Standard sieve). The binder was used in proportions of less than 5.0 lbs. of polymer for 100 lbs. of dolomite, the particular amount of polymer being that considered optimum for the selected polymer. The binder was thoroughly mixed with the aggregate so that the grains were coated thereby. The mixtures were then tested for trowelability, adhesion after application and inversion to 180°, bond strength after heating over a 6-hour period to 1800° F., appearance of the surface with respect to cracks or laminations and ceramic quality. For these tests each mixture was placed in an open-top, refractory mold 2 inches wide, 6 inches long and 2 inches deep and compacted to a depth of 1½ inches by hand tamping. Each property tested was given a rating from 1-5 going from excellent, good, fair, poor, to very poor. The results are shown in the following table. Each of the materials shown by the following table were given a total score based on the cumulative ratings for the characteristics tested. A total score below 10 with no individual rating above 3 was considered to indicate a satisfactory material.

| Resin class | Trowel-ability | Adhesion inverted 180° | Bond after 6 hours to 1,800° F. | Surface cracks or laminations | Ceramic quality | Score |
|---|---|---|---|---|---|---|
| 1. α-Methyl polystyrene: AMS-10 | 1 | 1 | 2 | 1 | 2 | 7 |
| 2. Polystyrene: Piccolastic A-5 | 2 | 2 | 4 | 1 | 5 | 14 |
| 3. Petroleum hydrocarbons: | | | | | | |
| Transphalt L-4 | 1 | 1 | 1 | 1 | 1 | 5 |
| Transphalt 25 | 4 | 5 | 4 (Est.) | 4 (Est.) | 4 (Est.) | [1] 21 |
| 4. Polybutene: Amoco H-300 | 1 | 1 | 2 | 1 | 3 | 8 |
| 5. Coumarone-indene: | | | | | | |
| Piccovar AP-10 | 2 | 2 | 2 | 1 | 2 | 9 |
| Piccovar AP-25 | 1 | 2 | 1 | 1 | 1 | 6 |
| 6. Polyester: | | | | | | |
| Hetrona 31 | 4 | 4 | 4 | 4 (Est.) | 4 (Est.) | [2] 20 |
| Hetrona 32A | 4 | 4 | 4 | 4 (Est.) | 4 (Est.) | [2] 20 |
| 7. Terpene type hydrocarbons: Piccolyte S-10 | 2 | 3 | 2 | 1 | 4 | 12 |

[1] This material diluted with a fuel oil rated 5.
[2] These materials diluted with fuel oil rated 20.

Note.—Limited to maximum of 5 parts binder to 100 parts refractory. The ratings marked "(Est.)" were estimated since the materials had already failed on at least two of the five tests. Ratings: 1=Excellent; 2=Good; 3=Fair; 4=Poor; 5=Very poor.

In the foregoing table, test 1, 3, 4 and 5 were with polymers selected in accordance with the present invention. In test 2 "Piccolastic A-5" is a low molecular weight polystyrene polymer having an estimated molecular weight of 300, a melting point by the ball and ring method of 5° C. and a flash point (COC) of 370° C. This resin is a low viscosity, non-drying, liquid at normal temperatures and might be expected to have the same properties as the α-methyl styrene polymer of test 1. However, use of this resin resulted in a poor bond after 6 hours heating to 1800° F. and the resulting ceramic quality of the bond was very poor. The terpene type of hydrocarbon resins represented by "Piccolyte S-10" while having properties which would seem similar to the selected resins of the invention, likewise provided a poor ceramic bond. Polyester resins of the low molecular weight type, represented by "Hetrona 31" and "Hetrona 32A," were not satisfactory. Compositions containing these materials could not be readily troweled and when diluted with fuel oil to increase trowelability still failed to provide satisfactory overall results. The "Transphalt 25" of Example 3 was difficult to trowel but when mixed with fuel oil was quite satisfactory, being substantially as good as "Transphalt L-4." "Transphalt 25" is a low molecular weight petroleum hydrocarbon resin having a softening point of 25° C. whereas "Transphalt L-4" is a liquid at ambient temperatures below 25° C.

The unexpected nature of the present invention will be readily apparent from the table.

Further represenative compositions within the scope of the invention are as follows:

EXAMPLE 1

A batch of premix material was prepared from dead-burned dolomite of a particle size 30% through No. 4 and retained on No. 12, 50% through No. 12 and retained on No. 50 and the remaining 20% passing through No. 50. This aggregate was thoroughly mixed in a blade type mixer with 3.1 lbs. of liquid α-methyl styrene polymer (Amoco AMS–10) and 1.7 lbs. of No. 4 fuel oil, per 100 lbs. of dolomite, so as to substantially coat the dolomite granules. The premix was poured into containers and transported to the location of a rotary furnace. It remained pourable during transit and was troweled and tamped into a two-inch wide joint extending 360° around the interior of a 10-foot diameter rotary furnace between old and new sections of the furnace lining. The material had excellent adhesion around the entire 360° and formed a permanent and successful ceramic bond between the brick courses when the furnace was put back in normal operation. In a subsequent shut-down for repairs on another section of the furnace, inspection of the subject joint showed that the material had burned in well around the full circle, had kept the bricks of the joined linings properly spaced and had become coated in the same manner as the adjacent linings.

Further representative premixes are made in similar manner as follows.

EXAMPLE 2

Dolomite aggregate having a size range as follows:

| 30% | −4  | +12 |
| 50% | −12 | +50 |
| 20% | −50 |     | is mixed with 2.5 lbs. of coumarone-indene resin (Piccovar–25) and 2.5 lbs. of No. 4 fuel oil per 100 lbs. of aggregate.

EXAMPLE 3

Dolomite aggregate having a size range as follows:

| 25% | −4  | +12 |
| 50% | −12 | +50 |
| 25% | −50 |     | is mixed with 2.5 lbs. of a petroleum resin (Transphalt–25) and 2.5 lbs. of No. 4 fuel oil per 10 lbs. of aggregate.

EXAMPLE 4

Dolomite aggregate having a size range as follows:

| 20% | −4  | +12 |
| 50% | −12 | +50 |
| 30% | −50 |     | is mixed with 5 lbs. of liquid petroleum resin (Transphalt L–4) per 100 lbs. of aggregate.

EXAMPLE 5

Dead-burned magnesite or dolomite aggregate having a size range as given in any of the preceding examples is mixed with 1.3 lbs. of a polybutene resin (Amoco H–300) and 3.7 lbs. of No. 4 fuel oil per 100 lbs. of aggregate.

EXAMPLE 6

Dead-burned magnesite or dolomite aggregate having a size range as given in any of the preceding examples is mixed with 2.4 lbs. of liquid α-methyl styrene polymer (Amoco AMS–10), 0.6 lb. of powdered carbon and 2.1 lbs. of 500 SUV fuel oil per 100 lbs. of dolomite.

It will be understood that the size ranges of the aggregate and proportions of the binder can be varied as desired within limits as will be readily determinable by those skilled in the art. However, the amount of polymer required is not over about 5% by weight of the aggregate and the total amount of polymer plus diluent, such as fuel oil, if used, need rarely exceed a total of 5%. The fuel oil may comprise from about 0.1 to 3.7% based on the weight of the refractory particles. Similar premixes are made with other refractory aggregate for appropriate uses. For example, particles of alumina may be substituted for dolomite or magnesite in the mixes of the examples and used in electric furnaces and the like requiring alumina refractories.

All percentages and parts referred to herein are by weight. Screen sizes are in all instances United States Standard sieve sizes.

The premix of the invention is not limited to the representative applications described above although it is of particular advantage in such applications. It can be used as packing in the re-piping of tap holes of electric steel making furnaces, to build up the bottom of ladles for molten steel, as a buffer lining between the inner lining and safety lining in basic oxygen furnaces as well as in patching and relining work. Denser back-up linings are formed between the linings of the basic oxygen furnace than can be realized with the ordinary solvent-tar bonded ramming mixtures of the art. It will be apparent that the mixture would also have utility in the preparation of shaped articles such as bricks, and other molded refractory articles.

In summary, some of the important advantages of the invention are:

(1) Ease of handling and application, the latter not limited to horizontal areas.

(2) Minimum shut-down time of furnace because no water or solvents need to be evaporated.

(3) Long shelf life due to absence of solvents. The product can be stored, transported and poured.

(4) Free-flowing characteristics enables close compaction and highest in situ density.

What is claimed is:

1. A pourable refractory composition for ramming, lining, patching or the like, which is substantially non-setting during storage and transportation but which has excellent cohesion and adhesion when pressed into place, consisting essentially of a mixture of non-acid refractory particles and from about 2–5% by weight, based on the weight of the particles, of a water-resistant, relatively non-volatile, polymeric material selected from the group consisting of (a) petroleum hydrocarbon resins having a softening point below about 100° C. derived from the bottom stream of a cracking process for petroleum crude oils, (b) α-methyl styrene polymer having a softening point below about 100° C., (c) coumarone-indene resins having a softening point below about 100° C., (d) mixtures of any of (a), (b) and (c) with each other, (e) mixtures of any of (a), (b), (c) and (d) with a liquid fuel oil;

said members (a), (b) and (c) where used alone being selected from those polymeric materials of the class described which are liquid or plastic and workable at temperatures below about 40° C., and said mixtures (d) and (e) containing sufficient liquid component to be plastic and workable below about 40° C.

2. The refractory composition of claim 1 wherein the refractory particles are dolomite grains.

3. The refractory composition of claim 1 wherein the polymeric material is α-methyl styrene polymer liquid at ambient atmospheric temperature.

4. The composition of claim 3 wherein the liquid α-methyl styrene polymer contains about 20–40% by weight of α-methyl styrene dimer.

5. The refractory composition of claim 1 wherein the polymeric material comprises coumarone-indene polymer.

6. The refractory composition of claim 1 wherein the polymeric material comprises α-methyl styrene polymer.

7. The composition of claim 1 comprising from about 0.1 to 3.7% of fuel oil based on the weight of the refractory particles.

8. A pourable refractory composition for ramming, lining, patching or the like, which is substantially non-setting during storage and transportation but which has excellent cohesion and adhesion when pressed into place, consisting of a mixture of non-acid refractory particles and from about 2–5% by weight, based on the weight of the particles of a water-resistant, relatively non-volatile, petroleum hydrocarbon resin derived from the bottom stream of a cracking process for petroleum crude oils and which is plastic and workable at a temperature below about 40° C.

References Cited
UNITED STATES PATENTS 3,340,075 9/1967 Stoddard et al. ........ 106—58
3,483,012 12/1969 Young .............. 106—61

ALLAN LIEBERMAN, Primary Examiner
T. DEBENEDICTIS, Sr., Assistant Examiner

U.S. Cl. X.R.
106—58